United States Patent [19]
Sass et al.

[11] Patent Number: 6,108,377
[45] Date of Patent: Aug. 22, 2000

[54] TRANSMITTER UNIT FOR AN ANTI-THEFT SYSTEM OF A MOTOR VEHICLE, AND METHOD FOR OPERATING THE TRANSMITTER UNIT

[75] Inventors: Dieter Sass, Regensburg; Herbert Froitzheim, Neunkirchen; Herbert Zimmer, Regensburg, all of Germany

[73] Assignee: Siemens Aktiengesellschaft, Munich, Germany

[21] Appl. No.: 09/026,664

[22] Filed: Feb. 20, 1998

[30] Foreign Application Priority Data

Feb. 20, 1997 [DE] Germany ............... 197 06 792

[51] Int. Cl.⁷ ................................. G08C 19/22
[52] U.S. Cl. ................. 375/239; 375/310; 375/377; 340/825.43; 340/825.6; 340/825.64; 341/176; 341/181; 341/182
[58] Field of Search ............... 340/426, 825.25, 340/825.43, 825.6, 825.64, 825.72; 341/176, 181, 182; 375/238, 239, 259, 377, 310

[56] References Cited

U.S. PATENT DOCUMENTS 3,363,199  1/1968  Besslich .
4,471,344  9/1984  Williams .................... 340/572

OTHER PUBLICATIONS

Dieter Nührmann: Professionelle Schaltungstechnik, Band 1/Teil 2, pp. 111–112, Franzis Verlag, 1996, ISBN 3-7723-4002-4.

*Primary Examiner*—Amanda T. Le
*Attorney, Agent, or Firm*—Herbert L. Lerner; Laurence A. Greenberg; Werner H. Stemer

[57] ABSTRACT

A transmitter unit generates a carrier signal in the form of a periodic bipolar signal. The carrier signal has intrapulse periods between two pulses of different polarity. A transmission antenna is operated with the bipolar signal. To prevent the harmonic oscillations of the transmitted signals from having excessively great amplitudes, the intrapulse period is defined such that the amplitude of the first harmonic of the transmitted oscillation, ascertained by Fourier analysis, is greater than 90% and the amplitude of the third harmonic oscillation is less than 25%, in comparison with the amplitude of the fundamental oscillation of a rectangular oscillation without intrapulse periods.

9 Claims, 2 Drawing Sheets

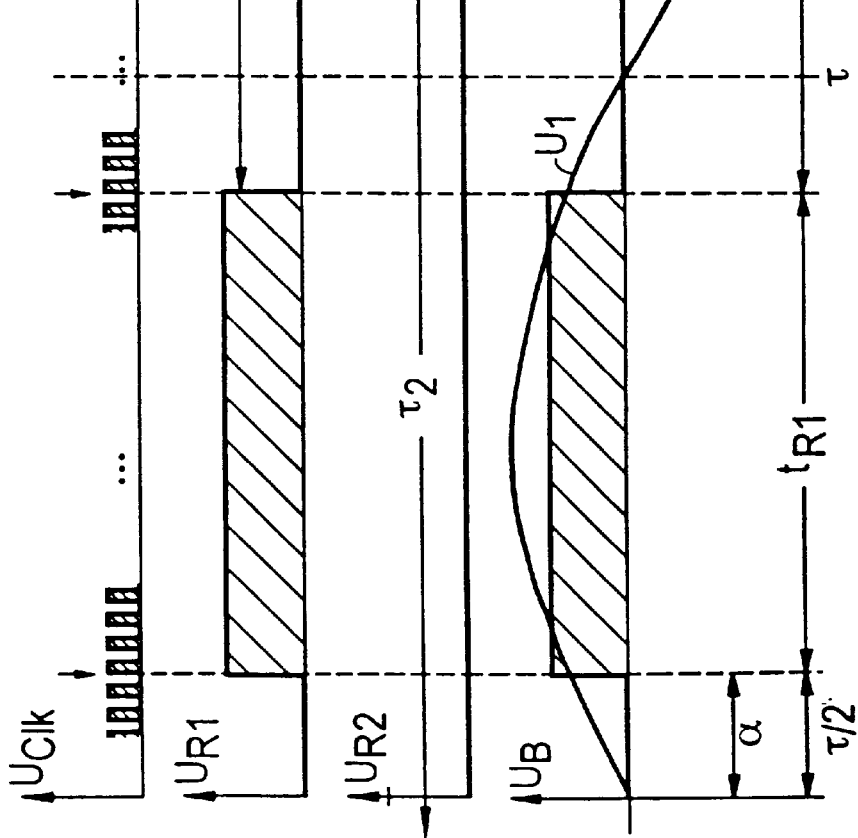

TRANSMITTER UNIT FOR AN ANTI-THEFT SYSTEM OF A MOTOR VEHICLE, AND METHOD FOR OPERATING THE TRANSMITTER UNIT

BACKGROUND OF THE INVENTION

Field of the Invention

The invention relates to security systems in automobiles, and more specifically to a transmitter unit for an anti-theft system of a motor vehicle and to methods for operating the transmitter unit, in which signals in the transmitter unit are transmitted on a carrier signal.

With a periodic rectangular signal $u_R$ (t) (FIG. 4) as the carrier oscillation it is possible to transmit data or energy by a transmission antenna in wireless fashion without major power losses. Each periodic rectangular signal $u_R$ can be broken down in a known manner with the aid of Fourier analysis—as shown in FIG. 4—into a sum of partial oscillations $u_i$ (where i=1 to n). As the partial oscillations, the results are a fundamental oscillation $u_1$ and many harmonic oscillations $u_3$ through $u_9$ (in FIG. 4, for the sake of simplicity, only the partial oscillations $u_i$ up to the ninth order are shown). The amplitudes of the individual partial oscillations $u_i$ depend on the shape of the rectangular signal $u_R$.

The sum of the fundamental oscillation $u_1$ and all the harmonic oscillations $$u_v = \left(\sum_{1}^{9} u_i\right)$$

with n=9) then produces the rectangular signal $u_R$ with its amplitude û (the rectangular signal $u_R$ is periodic, with a period length T=2π: it assumes the value +û from 0 to π and the value –û from π to 2π).

According to Fourier, every time function u(t) for every periodic non-sine-shaped oscillation can be expressed as an infinite series:

$$u(t) = a_0 + \sum_{n=1}^{\infty} (a_n \cos n\omega t + b_n \sin n\omega t) \quad (1)$$

$$= a_0 + a_1 \cos\omega t + b_n \sin n\omega t + \ldots +$$

$$b_1 \sin\omega t + b_2 \sin 2\omega t + \ldots$$

where u(t)=time function, $a_o$, $a_n$, and $b_n$=Fourier coefficients, n=integer, ω=2π/T=angular velocity, T=period length, and t=time.

In each Fourier analysis, the Fourier coefficients $a_o$, $a_n$ and $b_n$ must be calculated:

$$a_0 = \frac{1}{T}\int_0^T u(t)dt \quad (2a)$$

$$a_n = \frac{2}{T}\int_0^T u(t)\cos(n\omega t)dt \text{ and} \quad (2b)$$

$$b_n = \frac{2}{T}\int_0^T u(t)\sin(n\omega t)dt \quad (3)$$

If the rectangular signal of FIG. 4 is broken down in the Fourier transform, the result using equations (1) through (3) is:

$$u_R(t) = \frac{4\hat{u}}{\pi}\left(\sin\omega t + \frac{1}{3}\sin 3\omega t + \ldots\right) \quad (4)$$

This shows that the fundamental oscillation $u_1$ is a sine-wave oscillation with the amplitude 4û/π, while the third harmonic oscillation $u_3$ oscillates in sine-wave fashion with triple the frequency (3 ωt), and the amplitude is one third the amplitude of the fundamental oscillation $u_1$.

In this rectangular signal $u_R$, there are no even-numbered orders of harmonic oscillations. The frequency of the fundamental oscillation $u_1$ is identical to the frequency of the rectangular signal. The harmonic oscillations $u_i$ have integral multiples of the fundamental frequency.

For wireless data or energy transmission in the automotive field, the rectangular signals can be used as a carrier oscillation, and information can be modulated onto them. For such transmissions, very specific frequency bands are authorized for the carrier oscillation. If a rectangular signal is used as a carrier oscillation, then the fundamental oscillation $u_1$ is within an authorized frequency band. The third harmonic oscillation $u_3$ (which for the rectangular signal $u_R$ has the highest amplitude of all the harmonic oscillations) may have its frequency in an unauthorized frequency range. As a result, the signal transmission can interfere with other applications outside the motor vehicle.

SUMMARY OF THE INVENTION

It is accordingly an object of the invention to provide a transmitter unit for an anti-theft system of a motor vehicle, and method for operating the transmitter unit, which overcomes the above-mentioned disadvantages of the prior art systems of this general type and which, on the one hand, generates only little interference by harmonic oscillations and, on the other hand, still transmits sufficiently high-amplitude signals.

With the foregoing and other objects in view there is provided, in accordance with the invention, a transmitter unit for an anti-theft system of a motor vehicle, comprising:

a transmission antenna transmitting a high-frequency oscillation;

a control unit connected to the antenna;

the control unit generates a periodic bipolar signal as a carrier oscillation for driving the antenna, the bipolar signal having rectangular pulses of different polarity and intrapulse periods between the rectangular pulses;

the control unit defining a length of the intrapulse periods such that an amplitude of a fundamental oscillation of a transmitted oscillation, ascertained by Fourier analysis, is greater than 90% of an amplitude of a fundamental oscillation of a rectangular oscillation formed of the rectangular pulses without the intrapulse periods, and an amplitude of a third harmonic oscillation is less than 25% thereof.

In accordance with an added feature of the invention, the transmission antenna is an RLC oscillating circuit inductively transmitting the high-frequency oscillation.

In accordance with an additional feature of the invention, the control unit has two output drivers and the RLC oscillating circuit is disposed between the output drivers, the output drivers outputting chronologically offset rectangular signals to the RLC oscillating circuit, which rectangular signals are superimposed in the RLC oscillating circuit to form the bipolar signal.

With the above and other objects in view there is also provided, in accordance with the invention, a method of operating a transmitter unit having a transmission antenna transmitting a high-frequency oscillation and a control unit driving the antenna. The method comprises the following steps:

generating a carrier oscillation in the form of a periodic bipolar signal with rectangular pulses of different polarity and intrapulse periods between the rectangular pulses of different polarity;

determining, with the control unit, an amplitude of a fundamental oscillation of the rectangular signal without the intrapulse periods;

defining, with the control unit, a length of the intra-pulse periods such that an amplitude of the fundamental oscillation of the signal driving the antenna, ascertained by Fourier analysis, is greater than 90% and the amplitude of the third harmonic oscillation is less than 25% as compared to the amplitude of the fundamental oscillation of the rectangular signal without the intrapulse periods.

In accordance with again an added feature of the invention, two chronologically offset periodic rectangular signals are fed to the antenna, and the antenna subtracts the two signals from one another for obtaining the bipolar signal.

In other words, the bipolar signal may be generated simply by superimposing two periodic rectangular signals. The rectangular signals are offset from one another chronologically, which creates the intrapulse periods in the bipolar signal.

In accordance with again another feature of the invention, the intrapulse periods of the bipolar signal are adjusted by varying a duty cycle of the two rectangular signals.

In accordance with a concomitant feature of the invention, a period length of the bipolar signal is adjusted by varying the pulse lengths of the two rectangular signals and/or by adjusting the intrapulse period lengths of the two rectangular signals.

The basic premise of the invention is to define the intrapulse periods such that the fundamental oscillation is still sufficiently great in its amplitude yet the harmonic oscillations are very slight.

Other features which are considered as characteristic for the invention are set forth in the appended claims.

Although the invention is illustrated and described herein as embodied in a transmitter unit for an anti-theft system of a motor vehicle, and method for operating the transmitter unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3a–3d are timing graphs of voltage signal courses within the transmitter unit.

DESCRIPTION OF THE PREFERRED EMBODIMENTS

Anti-theft systems for motor vehicles make use of energy or data signals which are transmitted in wireless fashion from a portable transmitter unit to the motor vehicle or vice versa. The signals may include information (in which case such a signal is called a code signal). The transmission of the signals takes place in a frequency range authorized for the automotive field, for instance at a carrier frequency of approximately 134 kHz or approximately 433 MHz.

Advantageously, high-frequency, periodic rectangular signals are used as carrier oscillations for transmission in anti-theft systems, and low-frequency information can be modulated onto them in the most various ways. According to Fourier—as described in further detail above—each periodic rectangular signal can be broken down into many partial oscillations $u_i$ (fundamental oscillation $u_1$ and harmonic oscillations $u_i$ (where i=2 through n)).

Figure 1:
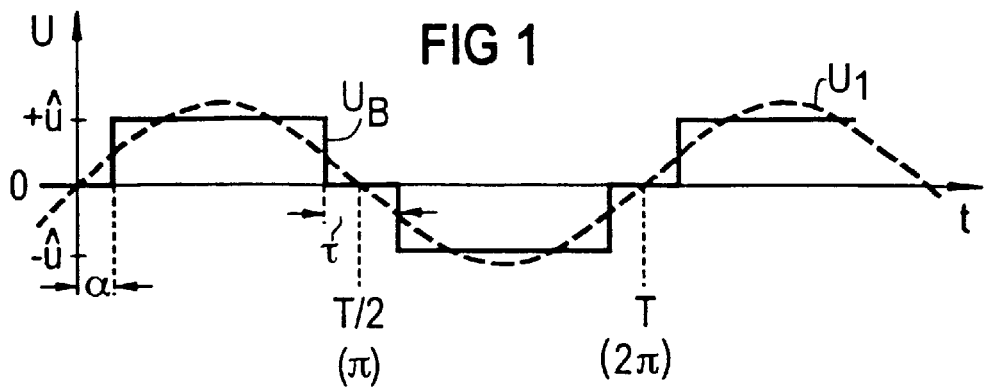
FIG. 1 is a time graph of a bipolar signal for controlling a transmission antenna.
Figure 2:
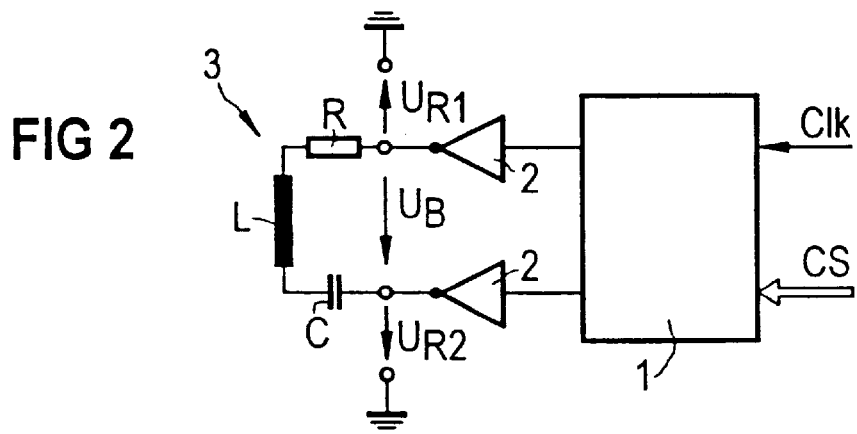
FIG. 2 is a block circuit diagram of the transmitter unit according to the invention.

Referring now to the figures of the drawing in detail and first, particularly, to FIG. 1 thereof, in order for the harmonic oscillations $u_i$ to have the lowest possible amplitudes yet for the fundamental oscillation $u_i$ to still be sufficiently powerful, a so-called bipolar signal $u_B$ is used as the carrier oscillation. The bipolar signal $u_B$ has rectangular pulses of a predetermined pulse length $t_{R1}$ and $t_{R2}$ and different polarity, between each of which is a respective intrapulse period $\tau$; that is, a positive rectangular pulse of amplitude $+\hat{u}$ is followed by an intrapulse period $\tau$ and then a negative rectangular pulse of amplitude $-\hat{u}$, followed in turn by an intrapulse period $\tau$. This process is continued periodically. Since the bipolar signal $u_B$ oscillates at a period length of T, hereinafter only a single period of the bipolar signal $u_B$ will be observed to represent the entire oscillation.

The following holds for the periodic bipolar signal $u_B(t)$:

0 for $0 < t \leq \alpha$
$+\hat{u}$ for $\alpha \leq t \leq (T/2-\alpha)$
0 for $T/2-\alpha \leq t \leq T/2+\alpha$
$-\hat{u}$ for $T/2+\alpha \leq t \leq t-\alpha$
0 for $T-\alpha \leq t \leq T$. (5)

If this bipolar signal $u_B$ is broken down according to Fourier into its partial oscillations $u_i$, then first the Fourier coefficients $a_o$, $a_n$ and $b_n$ must be calculated. Since these involve an odd-numbered function, the Fourier coefficients $a_o$ and $a_n$ are equal to zero.

The Fourier coefficients $b_n$ are obtained as $$b_n = \frac{2}{T}\int_0^T u(t)\sin(n\omega t)dt \quad (6)$$

If equation (5) is inserted into equation (6), then with the aid of equation (1) the bipolar signal $u_B(t)$ is obtained as follows:

$$u_B(t) = \frac{4\hat{u}}{\pi}\left(\cos\alpha\sin\omega t + \frac{1}{3}\cos3\alpha\sin3\omega t + \frac{1}{5}\cos5\alpha\sin5\omega t + \ldots\right) \quad (7)$$

in which the angle $\alpha$ corresponds to half the intrapulse period $\tau$ ($\alpha$ is expressed in degree of angle, while the intrapulse period $\tau$ is a time; the relationship between the time and angle is that the period length T is equivalent to the angle 360°; by giving an angle, $\alpha$ is independent of the frequency).

It can be seen from this that the sine-wave fundamental oscillation $u_1$ (shown in dashed lines in FIG. 1) has an amplitude of $$\frac{4\hat{u}}{\pi}\cos\alpha.$$

The third harmonic oscillation $u_3$, conversely has an amplitude of $$\frac{4\hat{u}}{3\pi}\cos 3\alpha.$$

The term ⅓ cos 3α reduces the amplitude of the third harmonic oscillation $u_3$ relative to the amplitude of the fundamental oscillation $u_1$.

Figure 4:
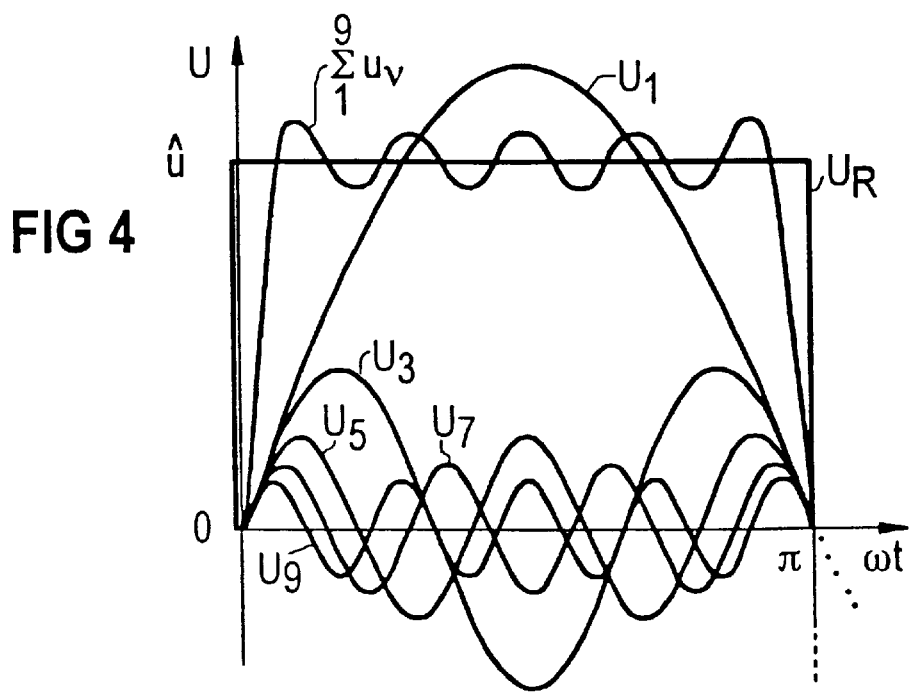
FIG. 4 is a rectangular signal that is broken down by Fourier analysis into its partial oscillations.

In Table 1 below, the amplitudes of the Fourier-decomposed rectangular signal $u_R$ without intrapulse periods, as shown in FIG. 4 and expressed in equation (4), are compared with the amplitudes of the Fourier-decomposed bipolar signal $u_B$, as shown in FIG. 1 and expressed in equation (7), in terms of a concrete example. For that purpose, assume for instance that the amplitude û of the bipolar signal $u_B$ is standardized and amounts to 1. The intrapulse period τ is assumed to be ⅒ the period length T. This produces an angle α (=½ the intrapulse period τ, that is, ¹⁄₂₀ of T) of 18°. Thus for the amplitudes the following values are obtained:

TABLE 1

|  | $u_1$ | $u_3$ |
|---|---|---|
| $\hat{u}_R$ | $4\hat{u}/\pi = 1.273$ | $4\hat{u}/3\pi = 0.424$ |
| $\hat{u}_B$ | $\frac{4\hat{u}}{\pi}\cos\alpha = 1.211$ | $\frac{4\hat{u}}{3\pi}\cos 3\alpha = 0.249$ |

It can be seen from Table 1 that the amplitude of the fundamental oscillation $u_1$ of the bipolar signal $u_B$ drops only little, while the amplitude of the third harmonic oscillation $u_3$ of the bipolar signal $u_B$ is greatly reduced compared with the amplitude of the Fourier-decomposed rectangular signal $u_R$ without intrapulse periods.

The intrapulse period τ between the two rectangular pulses of different polarity must, however, not become excessively long, because otherwise the fundamental oscillation $u_1$ would become too low in its amplitude, because of the cos α factor (the angle α corresponding to half the intrapulse period, that is, τ/2). However, the intrapulse period τ must not become too short, either, because otherwise the amplitude of the third harmonic oscillation $u_3$ becomes too great.

In order for the transmitted signal still to have sufficiently high amplitudes, the amplitude of the fundamental oscillation $u_1$ of the bipolar signal $u_B$, ascertained by Fourier analysis, is defined with the aid of the intrapulse period τ to greater than approximately 90% of the amplitude of the fundamental oscillation $u_1$ of the rectangular signal $u_R$ without intrapulse periods. To assure that the harmonic oscillations $u_i$ will not have too much of an interfering effect in higher frequency ranges, the amplitude of the third harmonic oscillation $u_3$ of the bipolar signal $u_B$ is defined with the aid of the intrapulse period τ to less than approximately 25% of the amplitude of the fundamental oscillation $u_1$ of the rectangular signal $u_R$.

With these specifications, limit values can be calculated between which the intrapulse period τ can be varied (expressed by the angle α), such as:

$$15° < \alpha < 26° \qquad (8)$$

Reference is now had to FIGS. 2 and 3a–3d, with the aid of which an embodiment of the transmitter unit for an anti-theft system will be described in the following:

The transmitter unit has a control unit 1 (FIG. 2), which is supplied at its inputs with a clock signal Clk (FIG. 3a) on the one hand and a control signal CS on the other. With the aid of the clock signal, the control unit 1 generates two rectangular signals $u_{R1}$ and $u_{R2}$ (FIGS. 3b and 3c). The rectangular signals $u_{R1}$ and $u_{R2}$ are delivered to a transmitting antenna 3 via two amplifiers 2. The transmission antenna 3 is embodied here as a series RLC oscillating circuit, which comprises a resistor R, a coil L, and a capacitor C.

Via the two amplifiers 2, the rectangular signals $u_{R1}$ and $u_{R2}$ are delivered, amplified, to the RLC oscillating circuit. The two rectangular signals $u_{R1}$ and $u_{R2}$ each have periodically recurring rectangular pulses, whose pulse lengths $t_{R1}$ and $t_{R2}$ are a given number of clock periods long. The rectangular pulses are followed by respective intrapulse period lengths $\tau_1$ and $\tau_2$. The rectangular pulse of the first rectangular signal $u_{R1}$ is located within the intrapulse period length $\tau_2$ of the second rectangular signal $u_{R2}$ (and vice versa); that is, the rectangular pulses are offset chronologically from one another. The pulse lengths $t_{R1}$ and $t_{R2}$ and the intrapulse period lengths $\tau_1$ and $\tau_2$ are imparted to the control unit (1) by the control signal CS. Thus they can easily be varied from outside.

The two rectangular signals $u_{R1}$ and $u_{R2}$ are superimposed in the RLC oscillating circuit (the two rectangular signals $u_{R1}$ and $u_{R2}$ are subtracted from each other). The superposition of the two rectangular signals $u_{R1}$ and $u_{R2}$ produces the bipolar signal $u_B$ (FIG. 3d), with which the oscillating circuit is incited to oscillate.

As a result of the oscillation of the oscillating circuit, a high-frequency magnetic field is created in the coil L, and in coil of a receiving unit, the coil not being shown but located in the vicinity, this field induces an alternating voltage, which is analogous to the oscillation in the oscillating circuit and thus analogous to the bipolar signal $u_B$. Information can be modulated onto this oscillation in addition and is then transmitted together with the carrier as a code signal to the receiver unit and checked there for authorization.

The two rectangular signals $u_{R1}$ and $u_{R2}$ are offset chronologically from one another by the angle of 180°. The distance between the trailing edge of the first rectangular signal $u_{R1}$ and the leading edge of the second rectangular signal $u_{R2}$ is equivalent to the intrapulse period τ, which is equal to the angle 2α.

In this exemplary embodiment, the angle α=18° has proved to be optimal; at this angle, the fundamental oscillation $u_1$ is sufficiently high in amplitude, and the third harmonic oscillation $u_3$ is sufficiently damped. For a bipolar signal $u_B$ having the angle α=18°, the amplitudes of the fundamental oscillation $u_1$ and the third harmonic oscillation $u_3$ are shown in Table 1.

The amplitude of the fundamental oscillation $u_1$ is 95.13% and the amplitude of the third harmonic oscillation $u_3$ is 19.56% of the amplitude of the fundamental oscillation $u_1$ of a rectangular signal $u_R$ without an intrapulse period τ.

It can be seen from this that the fundamental oscillation $u_1$ is still sufficiently high in amplitude, but the third harmonic $u_3$ is reduced considerably in its amplitude. Interference by the third harmonic oscillation $u_3$ is thus reduced. The further harmonic oscillations $u_5$, $u_7$, etc. need not be taken into account further, since their amplitudes are negligibly small compared with the amplitude of the fundamental oscillation $u_1$.

If the frequency of the bipolar signal $u_B$ is changed, then the frequency of the fundamental oscillation $u_1$ changes as well. As a result, the frequency of the bipolar signal $u_B$ can be varied by varying the intrapulse period lengths $\tau_1$ and $\tau_2$ and the pulse lengths $t_{R1}$ and $t_{R2}$ of the rectangular pulses $u_{R1}$ and $u_{R2}$ (see FIGS. 3b and 3c) on the specification of the control signal CS.

At a constant clock frequency, the length of the pulse length $t_{R1}$ and $t_{R2}$ and the ensuing intrapulse period lengths $\tau_1$ and $\tau_2$, respectively, until the next rectangular pulse can be defined by a predetermined number of clock pulses. At an oscillator frequency of 16 MHz (T=62.5 ns) and a desired oscillation frequency of approximately 134.4 kHz, the intrapulse period $\tau$ can for instance be approximately twelve clock periods (=0.75 μs) long, and the pulse lengths $t_{R1}$ and $t_{R2}$ can each be approximately 48 clock periods (=3 μs) long. The term "duty cycle", in this context, defines the mark-to-space ratio $t_{R1}/\tau_1$, $t_{R2}/\tau_2$ (pulse to no-current ratio) of the rectangular signals.

Thus the period length T of the bipolar signal $u_B$ becomes approximately T=7.5 μs (which is equivalent to the frequency f=1/T=133.3 kHz). In that case, the twelve clock periods for the intrapulse period $\tau$ last ⅒ of the pulse length T. This accordingly leads to the angle α of approximately 18°. For different oscillation frequencies, the number of clock periods for the pulse lengths $t_{R1}$ and $t_{R2}$ can be varied in each case, which the intrapulse period $\tau$ can remain constant at twelve clock pulses. In any case, the limit values of equation (8) must be taken into account.

The result is thus a transmitter unit that controls a transmission antenna 3 with a bipolar signal $u_B$ with reduced harmonics. Such transmitter units can be used for instance for locking systems of a motor vehicle, in which a code signal is transmitted by a portable transmitter upon actuation of a key to the vehicle in order to lock or unlock the doors. This transmitter unit can also be used to send code signals from a transponder, which is disposed on an ignition key, to an electronic immobilizer, as soon as the ignition key is turned in the ignition lock and the ignition switch is turned on.

Advantageously, energy can also be sent from the transmission antenna to the transponder. Precisely for energy transmission, the bipolar signal $u_B$ is especially suitable.

The code signal, after being received, is checked for authorization, to which end it is compared with an expected desired code signal. If the signals agree (that is, if authentication is successful), the immobilizer is released, or door locks are locked or unlocked. The code signals can also contain other control information, with which upon authorization such functions as closing and opening of the windows or sliding roof or convertible top can be remote-controlled.

The control unit 1 can be embodied by a microprocessor or functionally equivalent components. Typical driver stages can be used as the amplifiers 2.

A bipolar signal $u_B$ is simple to generate. A constant voltage need merely be turned on and off and optionally amplified at certain times. This has the advantage of producing less power loss compared with a sine-wave carrier, since a sine-wave signal has to be amplified continuously.

The bipolar signal $u_B$ used as the carrier oscillation can be modulated in a very simple way with low-frequency information, by keeping the bipolar signal $u_B$ switched off for a predetermined length of time and on for another predetermined length of time. The different times then determine the information contained in the transmitted signal. Thus in the exemplary embodiment for the logical H level the bipolar signal $u_B$ can be kept off for 500 μs and switched on for 500 μs. For the logical L level, conversely, it can be off for 100 μs and on for 400 μs. By measuring the times upon reception of a transmitted signal, the information content of the signal can be detected.

In this exemplary embodiment, the bipolar signal $u_B$ has a period length T=7.5 μs, which is equivalent to a carrier frequency f=1/T=133.33 kHz.

The transmitter unit may be disposed as an integrated circuit on a semiconductor chip. This makes it very small in its dimensions, and it can therefore be easily accommodated on the grip portion of a key, or on a credit-card-sized card (chip card, smart card).

We claim:

1. A transmitter unit for an anti-theft system of a motor vehicle, comprising:

a transmission antenna transmitting a high-frequency oscillation;

a control unit connected to said antenna;

said control unit generates a periodic bipolar signal as a carrier oscillation for driving said antenna, the bipolar signal having rectangular pulses of different polarity and intrapulse periods between the rectangular pulses;

said control unit defining a length of the intrapulse periods such that an amplitude of a fundamental oscillation of a transmitted oscillation, ascertained by Fourier analysis, is greater than 90% of an amplitude of a fundamental oscillation of a rectangular oscillation formed of the rectangular pulses without the intrapulse periods, and an amplitude of a third harmonic oscillation is less than 25% thereof.

2. The transmitter unit according to claim 1, wherein said transmission antenna is an RLC oscillating circuit inductively transmitting the high-frequency oscillation.

3. The transmitter unit according to claim 2, wherein said control unit has two output drivers and said RLC oscillating circuit is disposed between said output drivers, said output drivers outputting chronologically offset rectangular signals to said RLC oscillating circuit, which rectangular signals are superimposed in said RLC oscillating circuit to form the bipolar signal.

4. A method of operating a transmitter unit having a transmission antenna transmitting a high-frequency oscillation and a control unit driving the antenna, the method which comprises:

generating a carrier oscillation in the form of a periodic bipolar signal with rectangular pulses of different polarity and intrapulse periods between the rectangular pulses of different polarity;

determining, with the control unit, an amplitude of a fundamental oscillation of the rectangular signal without the intrapulse periods;

defining, with the control unit, a length of the intra-pulse periods such that an amplitude of the fundamental oscillation of the signal driving the antenna, ascertained by Fourier analysis, is greater than 90% and the amplitude of the third harmonic oscillation is less than 25% as compared to the amplitude of the fundamental oscillation of the rectangular signal without the intrapulse periods.

5. The method according to claim 4, which comprises outputting two chronologically offset periodic rectangular signals to the antenna, and subtracting the two signals from one another in the antenna for obtaining the bipolar signal.

6. The method according to claim 5, which comprises adjusting the intrapulse periods of the bipolar signal by varying a duty cycle of the two rectangular signals.

7. The method according to claim 5, which comprises adjusting a period length of the bipolar signal by varying pulse lengths of the two rectangular signals.

8. The method according to claim 5, which comprises adjusting a period length of the bipolar signal by varying the intrapulse period lengths of the two rectangular signals.

9. The method according to claim 5, which comprises adjusting a period length of the bipolar signal by varying the intrapulse period lengths and the pulse lengths of the two rectangular signals.

* * * * *